(12) United States Patent
Wu (10) Patent No.: US 9,131,544 B2
(45) Date of Patent: Sep. 8, 2015

(54) LED DRIVER PROTECTION CIRCUIT

(71) Applicant: RAB Lighting Inc., Northvale, NJ (US)

(72) Inventor: Mingliang Wu, Piermont, NY (US)

(73) Assignee: RAB Lighting Inc., Northvale, NJ (US)

( * ) Notice: Subject to any disclaimer, the term of this patent is extended or adjusted under 35 U.S.C. 154(b) by 0 days.

(21) Appl. No.: 13/690,874

(22) Filed: Nov. 30, 2012

(65) Prior Publication Data

US 2013/0141004 A1 Jun. 6, 2013

Related U.S. Application Data

(60) Provisional application No. 61/565,507, filed on Dec. 1, 2011.

(51) Int. Cl.
*H05B 37/02* (2006.01)
*H05B 33/08* (2006.01)

(52) U.S. Cl.
CPC ............ *H05B 37/02* (2013.01); *H05B 33/0815* (2013.01); *H05B 33/0887* (2013.01); *Y02B 20/341* (2013.01)

(58) Field of Classification Search
CPC ...................................................... H05H 37/02
USPC .......................... 315/247, 291, 297, 307, 309
See application file for complete search history.

(56) References Cited

U.S. PATENT DOCUMENTS

| 2011/0148318 A1* | 6/2011 | Shackle et al. ................ 315/291 |
| 2012/0033459 A1* | 2/2012 | Chang et al. ............... 363/21.18 |
| 2014/0021874 A1* | 1/2014 | Chen ........................ 315/200 R |

OTHER PUBLICATIONS

Texas Instruments Inc. "LED Reference Design Cookbook" brochure, 65 pages, 2nd Quarter 2010.
ST Microelectronics "SEA05: Advanced Constant Voltage and Constant Current Controller" datasheet, 10 pages, Apr. 2010.
ST Microelectronics "L6562A: Transition-Mode PFC Controller" datasheet, 26 pages, Aug. 2007.
Texas Instruments Inc. "50W PFC LED Drive Transition Mode Flyback" flyer, 2 pages, Jan. 17, 2009.

* cited by examiner

*Primary Examiner* — Don Le
(74) *Attorney, Agent, or Firm* — SmithAmundsen LLC; Kelly J. Smith; Dennis S. Schell (57) ABSTRACT

An illustrative LED driver circuit is based on a transition-mode power factor correction integrated circuit using flyback topology. The LED driver circuit features a universal input circuit having various fault and surge protections, output circuit open load and short circuit protection, and main transformer over temperature protection.

13 Claims, 6 Drawing Sheets

LED DRIVER PROTECTION CIRCUIT

CROSS-REFERENCE TO RELATED APPLICATIONS

This application is a non-provisional of U.S. Provisional Patent Application 61/565,507, filed Dec. 1, 2011, and titled LED Driver Protection Circuit, which is entirely incorporated herein by reference.

BACKGROUND

The present invention relates to driver circuits for LED lighting, and particularly, to protective aspects of driver circuits for LED lighting.

One type of driver circuit for LED lighting utilizes a power factor correction (PFC) controller, for example, a current-mode PFC controller operating in transition mode, and a flyback converter providing an isolated supply to LEDs.

It is desirable to provide various circuit protection features for an LED driver circuit utilizing a PFC controller without having to add expensive circuit components or complexity that increases the cost of implementing typical circuit protection schemes disclosed by the prior art.

SUMMARY

The present invention may comprise one or more of the features recited in the attached claims, and/or one or more of the following features and combinations thereof.

An illustrative LED driver circuit is based on a transition-mode power factor correction controller (PFC) integrated circuit using flyback topology. The LED driver circuit features a universal input circuit having various fault and surge protections, output circuit open load and short circuit protection, and main transformer over temperature protection.

Additional features of the disclosure will become apparent to those skilled in the art upon consideration of the following detailed description of the illustrative embodiment.

BRIEF DESCRIPTION OF THE DRAWINGS

The detailed description particularly refers to the accompanying figures in which.

DESCRIPTION OF THE ILLUSTRATIVE EMBODIMENTS

For the purposes of promoting and understanding the principals of the invention, reference will now be made to one or more illustrative embodiments illustrated in the drawings and specific language will be used to describe the same.

LED Driver with Flyback Transformer Overview

Figure 1A:
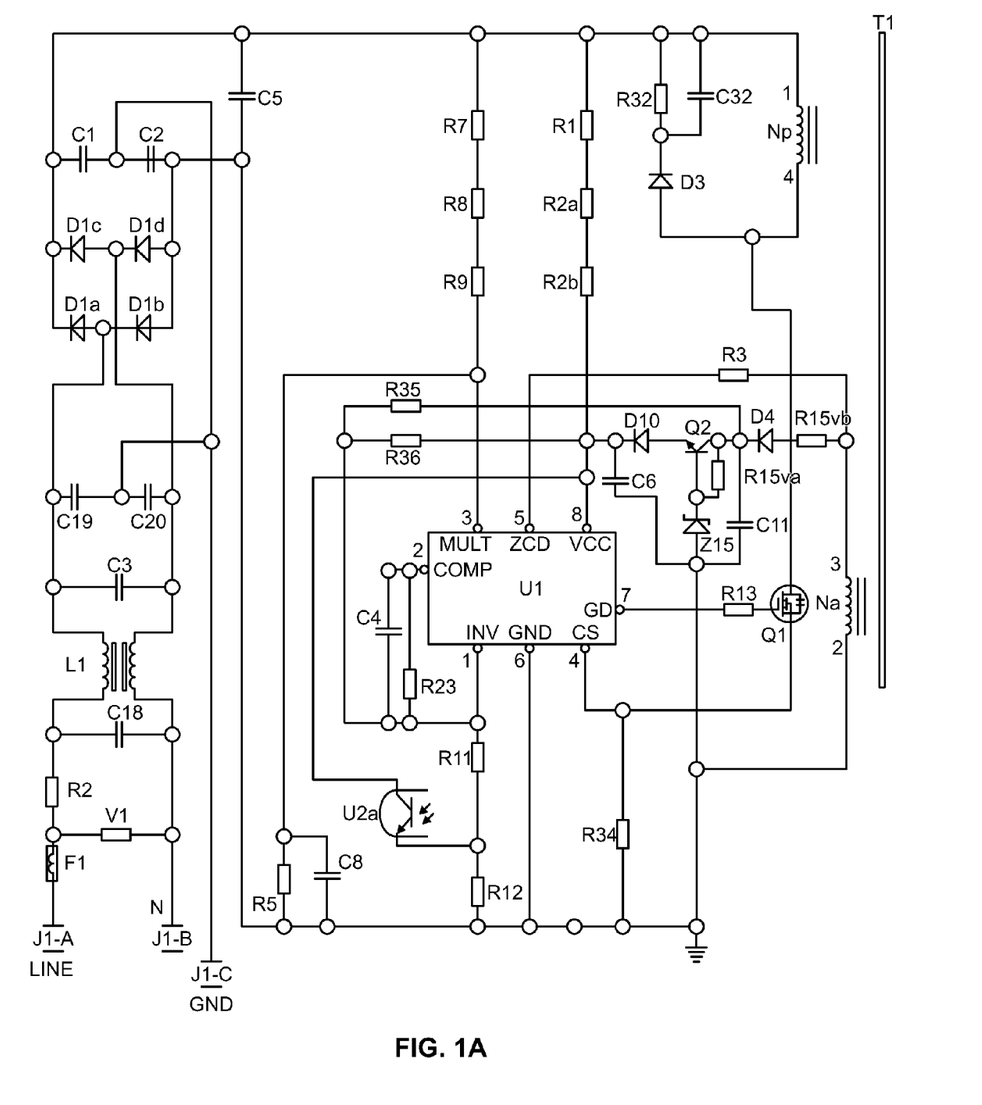
FIGS. 1A and 1B is a schematic diagram of an LED driver circuit according to the present invention, FIG. 1A illustrating the input circuit and FIG. 1B illustrating the isolated output circuit.
Figure 1B:
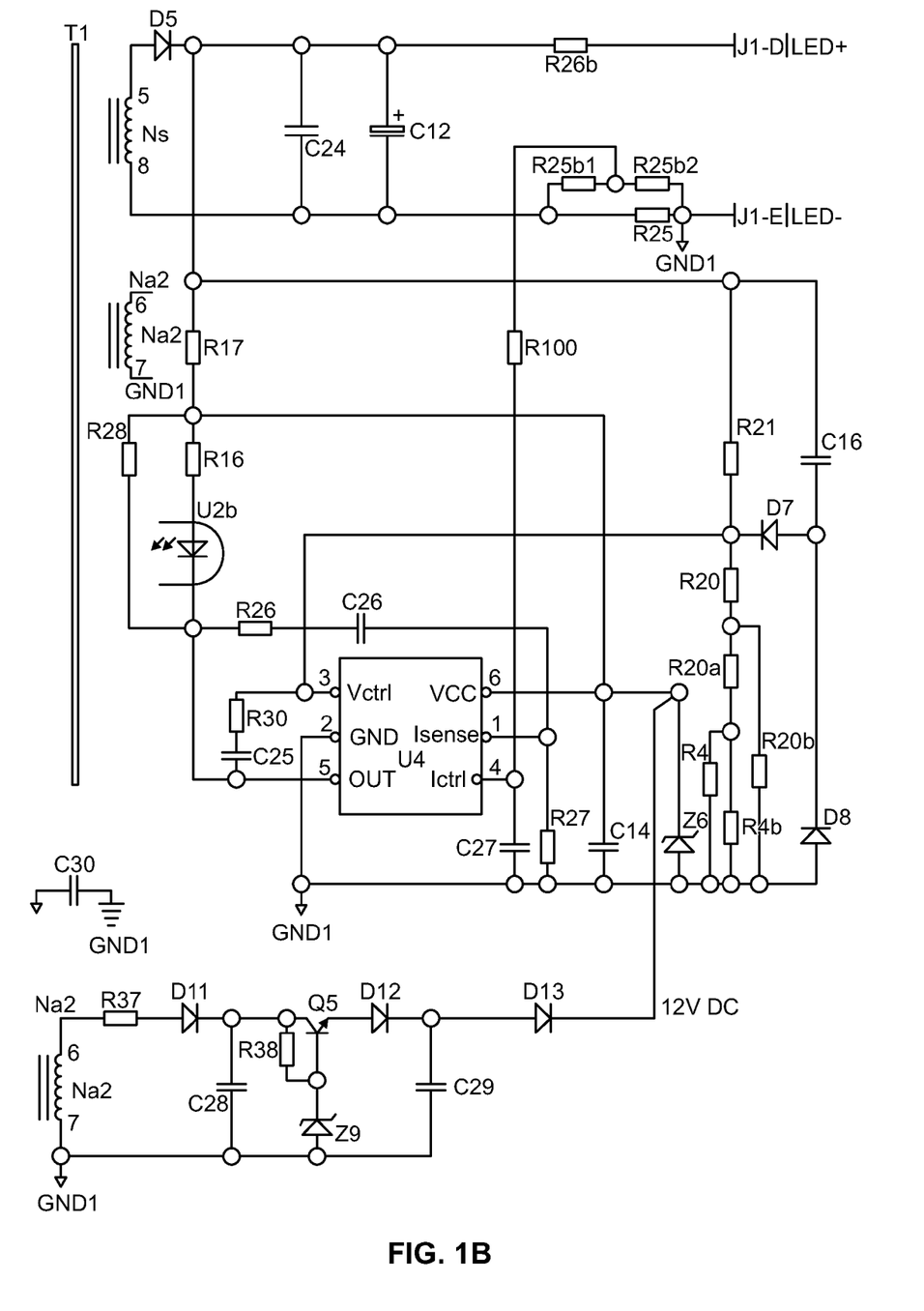

Referring to FIGS. 1A and 1B, the schematic for an illustrative embodiment of a driver circuit for LED lighting is shown. The PFC input circuit portion of the driver circuit illustrated in FIG. 1A is based on a transition-mode PFC controller IC U1, for example an L656x series IC, for example, L6562A, available from STMicroelectronics of Coppell, Tex. and Geneva, Switzerland. The driver circuit uses a flyback converter topology and accommodates a power line input voltage ranging from 120 Vac to 277 Vac.

Referring to FIG. 1A, a boost converter is connected to the output of rectifier bridge diodes D1a, D1b, D1c, and D1d. A flyback switch includes a MOSFET Q1 and is driven by the IC U1. The boost transformer T1 provides the coupling between a primary winding Np and a secondary winding Ns (FIG. 1B). Diode D3 and R32/C32 circuit clamp the peak leakage inductance voltage spike at Q1 turn-off.

Upon startup, IC U1 is powered by circuit voltage supply VCC across capacitor C6, which is charged from line rectified DC voltage VDC via resistors R1, R2a, and R2b. Transformer T1's auxiliary winding Na and associated components can be used to generate 15V VCC for IC U1 during normal operation.

Resistor R3 is also connected to auxiliary winding Na to provide a transformer signal to the L656x current sensing (ZCD) pin of IC U1, turning on MOSFET Q1 at every switching cycle. Resistor R34 senses the current flowing into the transformer primary side. Once the signal at the current sense pin ZCD has reached the level programmed by an internal multiplier of the L656x, MOSFET Q1 turns off. A voltage divider formed by resistors R7/R8/R9 and R5 provides a multiplier (MULT) pin of IC U1 with instantaneous voltage information which is used to modulate the current flowing into the transformer T1 primary side. IC U2a/b is an optocoupler. The input side U2a is located in the PFC/input circuit portion of the circuit (FIG. 1A), and the output side U2b is located in the output circuit portion of the LED driver circuit (FIG. 1B). Optocoupler U2 transfers a control signal from the output circuit portion of the LED driver circuit to the PFC/input circuit portion of the LED driver circuit, for example, to the INV pin, inverting input of the error amplifier of the IC U1, which also doubles as an ON/OFF control input.

Flyback LED Driver Control Circuit Overview

Referring to FIG. 1B, an output rectifier diode D5 coupled to the secondary winding Ns of the boost transformer T1 is a fast recovery type diode. Capacitor C24 is coupled across the output to filter out high frequency ripple. The output voltage ripple frequency is twice the input, measured as 120 HZ. The resulting voltage ripple is less than 3.0% at the LED lamp and the current ripple is about 20% through LED lamp.

Figure 3:
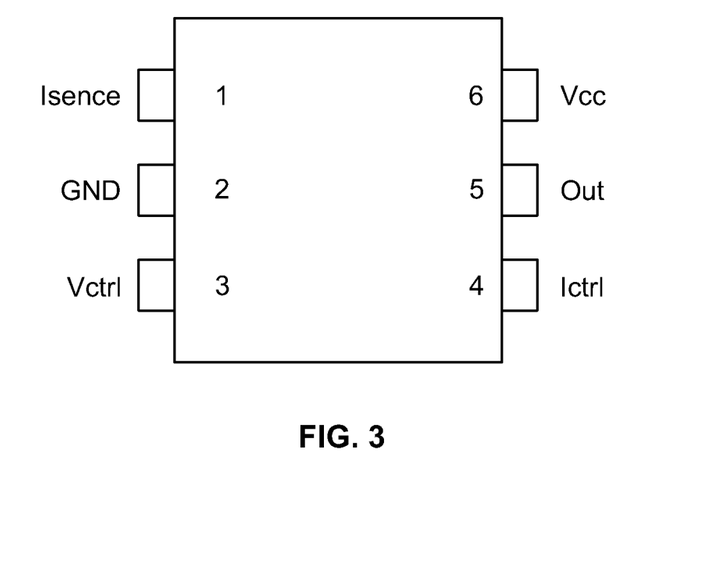
FIG. 3 is an illustrative pin layout diagram of IC U4 of the LED driver circuit of FIGS. 1A and 1B.

The output voltage and current feedback to the PFC, IC U1 is provided by the optocoupler U2a/b. The optocoupler input U2b is driven by a control output, OUT pin 5 of IC U4 (FIG. 3), a constant voltage, constant current secondary controller integrated circuit U4, for example, SEA05 available from STMicroelectronics of Coppell, Tex. and Geneva, Switzerland. The IC U4 includes a dual control loop to perform current control and voltage control (CC and CV) regulation. The IC U4 integrates a voltage reference, two Op Amps, and a low side current sensing circuit. The control output, OUT pin 5, is a common open-drain output of the two internal op-amps, and Vcc pin 6, is the voltage supply for IC U4.

Output voltage sensing is provided using resistors R21 and R20/R20b, which form a voltage divider circuit, the midpoint of which is coupled to IC U4 Vctrl input, pin 3 for SEA05, to sense the output voltage available to drive the LED lamp. Vctr is an inverting input of the voltage loop op-amp of IC U4. Output current sensing is provided using resistor network R25, R25b1, R25b2 coupled to the IC U4 Ictrl input, pin 4 for SEA05, for low-side current sensing. Isense, pin 1 of IC U4, is an inverting input of the current loop op-amp. GND, pin 2 of IC U4 is the ground, return of the bias current of the device and provides a 0 V references for all voltages.

Circuit Input Protection Features

Figure 2:
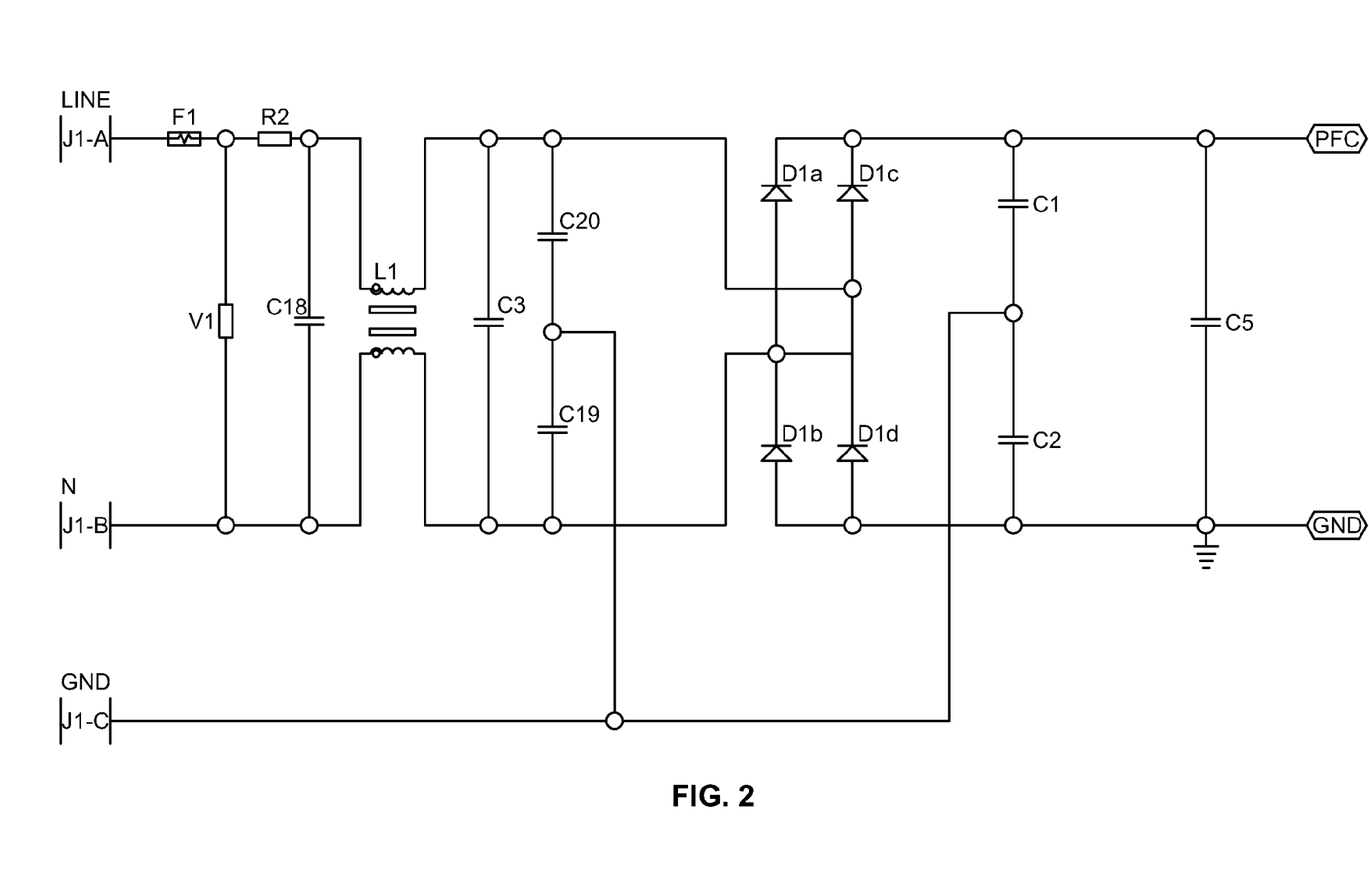
FIG. 2 is a schematic diagram of a power line input and EMI portion of the LED driver circuit of FIGS. 1A and 1B.

Referring to FIG. 2, a power line input and EMI portion of the LED driver circuit is illustrated. The power input circuit includes a fuse F1, an EMI filter inductor L1 and associated capacitors, Varistor V1, an inrush limiting device R2, and a rectifier bridge using diodes D1a, D1b, D1c, and D1d.

The input circuit provides various fault and surge protections. Fuse F1 is provided in series with the input power line, and thus prevents shorting of the input power line by a short failure within the driver circuit. Varistor V1 is electrically coupled between the power line input and the neutral input and protects the circuit from voltage surges. In order to support a universal power line input feature, a varistor with a voltage rating of 320 V can be used.

Inrush limiting device R2 can be a Negative Temperature Coefficient (NTC) thermistor. For example, before power is supplied to the driver circuit, the temperature of the NTC thermistor R2 is about room temperature and the NTC thermistor has a high resistance value; therefore, the NTC thermistor limits power line current when power is first supplied and the driver circuit is starting. After startup, the temperature of NTC thermistor R2 rises and its resistance value decreases; therefore, power loss due to the NTC thermistor R2 decreases. NTC thermistor R2 can thus reduce the power line inrush current when the driver circuit is first starting.

Circuit Output Protection Features

Figure 4:
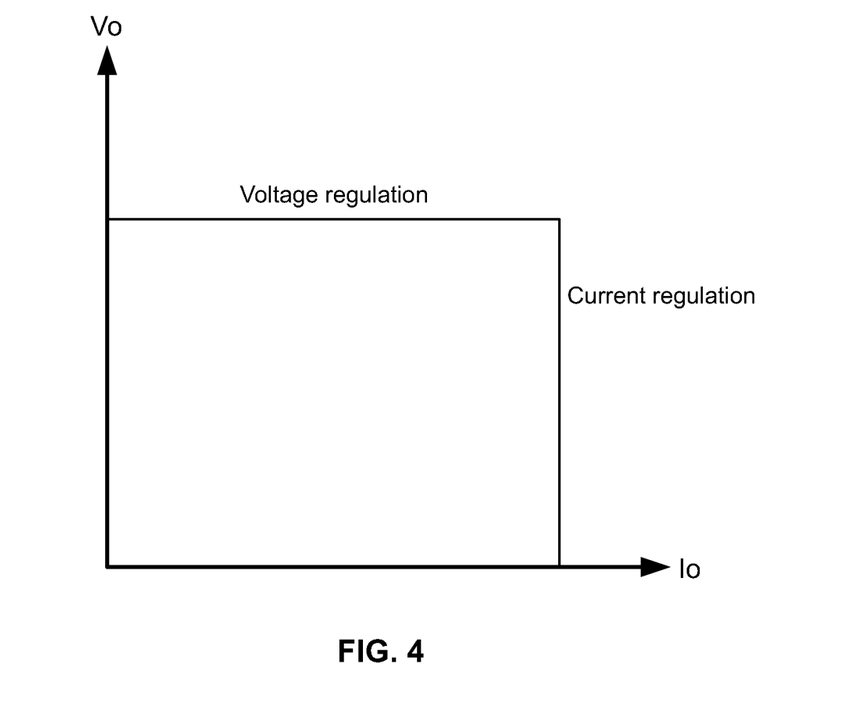
FIG. 4. is a graph of the illustrative voltage regulation and current regulation control curve of IC U4 of FIGS. 1A and 1B.
Figure 5:
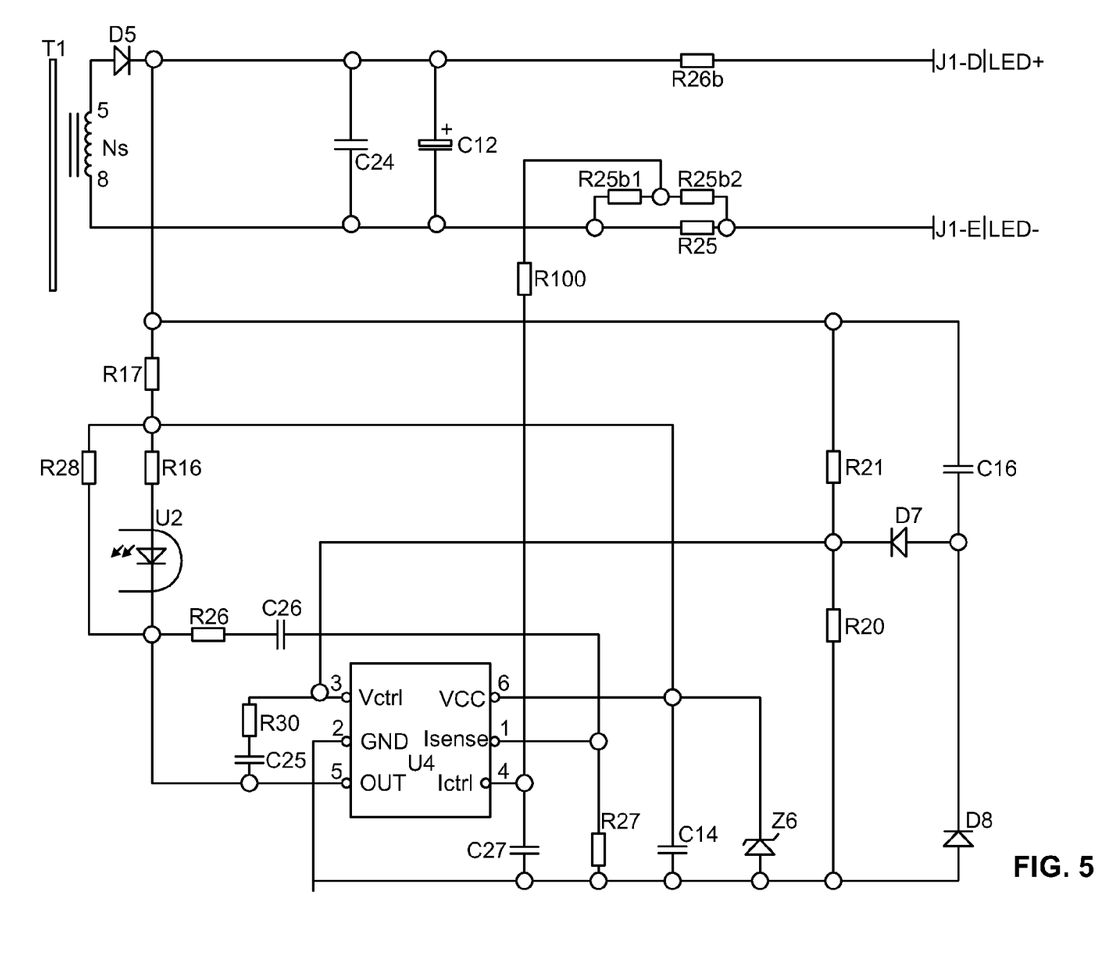
FIG. 5 is a schematic diagram of first embodiment of an output circuit portion of the LED driver circuit of FIGS. 1A and 1B.

Referring to FIG. 5, illustrating a first illustrative embodiment of the output portion of the LED driver circuit, the output voltage and current feedback is provided to the input of the optocoupler U2, driven by the OUT pin 5 of IC U4. The voltage regulation function of IC U4 is used to limit the output voltage in the event of an open circuit. And the current regulation function of the IC U4 is used to provide a constant current to the LED lamps connected to the driver circuit. When the equivalent load resistance increases above a certain value, the current from the driver circuit to the LED lamps will decrease. FIG. 4 illustrates the constant current CC and constant voltage CV control curve for the IC U4 under normal conditions.

In the event that the LED driver circuit load (output LED+ and LED−) is an open circuit, the output voltage can be limited to a predetermined value for safety. For example, in the illustrative embodiment shown in FIG. 5, a typical LED lamp is rated for 36 V and 720 mA. The junction between resistors R20 and R21 is provided to the Vctrl of IC U4 for sensing the output voltage, and thus the output voltage provided by the driver circuit depends on the voltage divider circuit comprising resistors R20 and R21. Based on the normal LED lamp rating, the values of the resistors R20 and R21 can be selected to provide a maximum output voltage of 45 Vdc when the output is an open circuit, and thus no load is provided.

The output portion of the driver circuit shown in FIG. 5 also provides a controlled constant current to the LED lamps. The current sensing resistor R25 is in series with the negative output LED-supplied to the LED lamps. In the illustrative embodiment, the value of resistor R25 is 0.10 Ohm, 1%. For accurate current sensing of the driver output, a divider circuit having resistors R25b1 and R25b2 coupled in parallel with current sensing resistor R25, are selected to provide the desired current output.

The illustrative IC U4 uses 50 mV for current sensing. The sensing resistor for rated lamp current of 720 mA lamp is thus determined to be 50 mV/0.72 A=69.4 mohm. Because of the difficulty in finding such low value and accurate sensing resistor, the two resistors R25b1 and R25b2 in parallel with current sensing resistor R25 are selected to provide the desired resistance that will provide 50 mV at a current flow of 720 mA through resistor R25. For example, the total value of resistor R25b1+R25b2 can be about 100 times the value of resistor R25.

Output short circuit protection is also provided by IC U4. There are two different times relating to the driver circuit when the LED load could be shorted: the output is shorted before the driver circuit has started, and the output is shorted after the driver circuit has started. While the resistor R100, 15 ohms, provides some protection to the IC U4, more short circuit protections are desired.

In the event the load on the driver circuit output (LED+ and LED−) is shorted before the LED driver circuit has started, in the output circuit of FIG. 5 there would be no power being supplied to the IC U4 Vcc pin for it to properly work. To resolve this issue, an additional or alternative source of power can be provided to the IC U4 Vcc pin, as is illustrated in the lower portion of FIG. 1B. Specifically, transformer output Na2 and associated components provide DC power to the IC U4 Vcc when power is not otherwise available from the input circuit shown in FIG. 1A, so that IC U4 is operational as the input circuit is started, thus providing output short circuit protection upon startup of the LED driver circuit.

In the event the load on the driver circuit output (LED+ and LED−) is shorted after the driver circuit has started, rapid discharge of capacitor C12 and a resulting excessively high current, is a risk. The addition of NTC thermistor R26b, shown in FIG. 5 provides protection from this risk. For steady state operation after the driver circuit has started, the electrolytic output capacitor C12 (1000 uF, 50V) is typically charged to about 36 Vdc.

If an output short develops after the driver circuit has started normally, the total normal circuit resistance receiving the charge from capacitor C12 is about 0.2 ohms, therefore, the initial short-circuit current can be about 180 A. This excessively high current value can cause arcing. Adding an NTC thermistor R26b in series with the output LED+ substantially reduces the arcing current. For example, with a 1 ohm NTC thermistor R26b, the initial short-circuit current is reduced to 36 V/1.2 ohm=30 A, about 17% of the original value. For normal driver circuit operation, after circuit startup and continuing operation, the temperature of NTC thermistor R26b increases, and the power loss due to thermistor R26b is substantially reduced.

Figure 6:
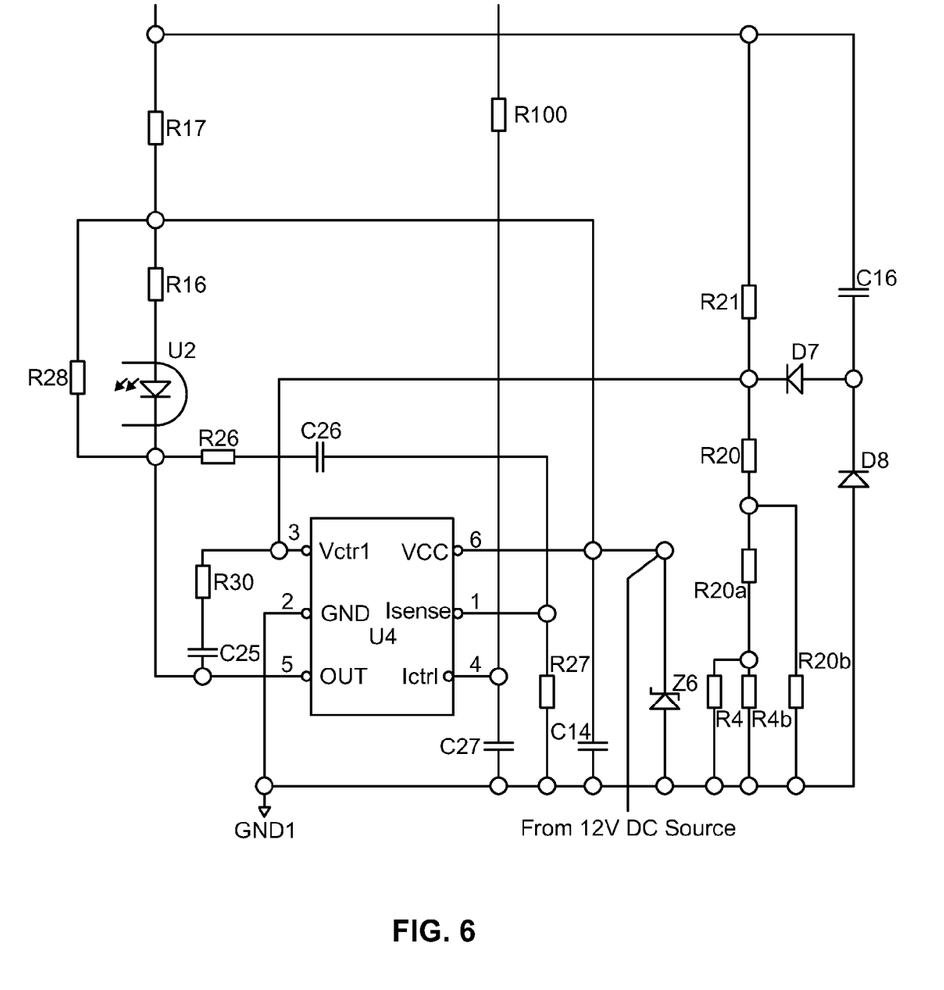
FIG. 6 is a schematic diagram of a second embodiment of an output circuit portion with over temperature protection of the LED driver circuit of FIGS. 1A and 1B.

FIG. 6 is a schematic of a second illustrative output circuit that incorporates over temperature protection (OTP), facilitated by components responsive to increases in the temperature of transformer T1. The voltage divider resistors R21, R20, and resistors R20a and R20b and PTC thermistors R4 and R4b provide the OTP function. Without the thermistors providing OTP, the output circuit is equivalent to a short across resistor R20b. As discussed above, resistors R20 and R21 provide a voltage feedback divider and are selected to provide a maximum output voltage of 45 Vdc.

Thermistors R4 and R4b can be thermally coupled with the transformer T1. In the event of an over-temperature situation, as the temperature of transformer T1 rises, the resistance value across thermistors R4 and R4b increases. At normal (room) operating temperature, the resistance of thermistors R4 and R4b are within the range of several hundred ohms, or less. As the thermistor temperatures increase, the resistance of thermistors R4 and R4b can rise to be several hundred kilo-ohms.

Assuming resistor R20a=0 ohm, and resistor R20b is open, PTC thermistors R4 and R4b provide a current divider circuit at low temperatures and the resistance of PTC thermistors R4 and R4b is low enough at low temperatures to not affect the divider circuit. At this low/normal temperature condition, voltage output for the circuit is thus limited to 45Vdc; however, as the temperatures rise and reach a certain level, the resistance of R20+R4 increases, causing a decrease in the LED output voltage, and therefore, the current and power output also decreases. With the output power to the LED lamps decreasing, both the LED lamps and the driver circuit should experience a reduction of temperature.

For example, thermistor R4 can be a through-hole type and be mounted near the main transformer T1, and thermistor R4b can be an SMD type and be mounted on the PCB under the main transformer T1. Thermistors R4 and R4b provide redundancy in the driver circuit to avoid a possible failure mode.

Advantageously, because the thermistors R4 and R4b can be discrete values, the resistance of the resistor net (R20, R20a, R20b, R4 and R4b) will provide an advantage of a smaller variance from unit to unit for thermal performance at mass production.

For illustrative embodiments for a 26 W LED, the following tables provide example component values:

TABLE A

Components of FIG. 1A

| Ref | Type/description |
|---|---|
| C19, C20, C32 | Cap, 2.2 nF, 300 V, Y2, 7.5 mm |
| C1, C2 | open |
| C3 | Cap 220 nF, 630 Vdc/310 Vac |
| C18 | Cap 100 nF, 630 Vdc/310 Vac |
| C5 | Cap 150 nF, 630 Vdc, 5%, 10 mm |
| C6, C11 | Cap, 10 U, 50 V |
| D3 | Rectifier, ultra-fast 1 A, 1000 V, DO-41 |
| F1 | Fuse, 2 A, 300 V, Radial |
| L1 | 25 mH, 0.85 ohm |
| Q1 | STF7N95K3 Power MOSFET, TO-220FP, 950 V |
| R2 | NTC, 4.7 OHM, 3.0 A, 265 V |
| R32 | RES, 100k, 2 W, 5% |
| R34 | RES 0.51 ohm, 1 W, 5% |
| T1 | 180 C. Ns = 25, Na = 10, Np = 96, Na2 = 10 |
| U2 | SFH615A Optocoupler DIP-4 |
| V1 | Varistor, 420 V, 10 mm |
| Z15 | Zener, 15 V, 0.5 W, 5%, SOD-123 |
| U1 | L6562D PFC controller, SO-8 |
| Q2 | NPN Transistor, 100 V, 1 A, STO23 |
| C8 | CAP 2.2 nf, 50 V, 10%, X7R, 805 |
| C4 | CAP 470 nF, 50 V, 10%, X7R, 805 |
| D1a, D1b, D1c, D1d | Diode, 1 A, 1000 V, SMA |
| D4 | Diode, 2 A, 200 V, SMA |
| D10 | Diode, 0.1 A, 100 V, SOD-80 |
| R35 | open |
| R36 | open |
| R1, R2a, R2b | RES 62 kΩ, 0.25 W, 1%, 1206 |
| R3 | RES 68 kΩ, 0.25 W, 1%, 1206 |
| R6, R11, R23 | RES 20 kΩ 1%, 805 |
| R7, R8, R9 | RES 1 MΩ 0.25 W, 1% 1206 |
| R15va | RES 10k, 1%, 0.25 W, 1206 |
| R12 | RES 2.0 kΩ, 1%, 805 |
| R13 | RES 10 ohm, 1%, 805 |
| R15vb | RES, 10 ohm, 1206, 5%, 0.5 W |

TABLE B

Components of FIG. 1B

| Ref | Type/description |
|---|---|
| C30 | Cap, 2.2 nF, 300 V, Y2, 7.5 mm |
| C16, C24 | Cap, 100 nF, 100 V |
| C28, C29 | Cap, 10 U, 50 V |
| C12 | Cap, 1000 uF, 50 V, 105° C., 10000 hr, 18*20 mm |
| D5 | Rectifier, ultra-fast 3 A, 200 V, DO-201A |
| R25b1 | RES 1.6 ohm, 0.5 W, 1% |
| R25b2 | RES 3.9 ohm, 0.5 W, 1% |
| R25 | RES 0.10 ohm, 1 W, 1% |
| T1 | 155 C. Ns = 25, Na = 10, Np = 96, Na2 = 10 |
| U2 | SFH615A-3091 Optocoupler DIP-4 |
| Z9 | Zener, 12 V, 0.5 W, 5%, SOD-123 |
| Z6 | open |
| U4 | SEA05 Current/Voltage controller, SOT23-6L |
| Q5 | NPN Transistor, 100 V, 1 A, STO23 |
| C25 | CAP 10 nF, 50 V, 10%, X7R, 1206 |
| C26 | CAP 220 nf, 50 V, 10%, X7R, 805 |
| C27 | CAP 10 nf, 50 V, 10%, X7R, 805 |
| C14 | open |
| D11 | Diode, 2 A, 200 V, SMA |
| D7, D8, D12 | Diode, 0.1 A, 100 V, SOD-80 |
| D13 | 0 ohm, 1206 |
| R21 | RES 100 kΩ, 0.25 W, 1%, 1206 |
| R26 | RES 100 kΩ, 1%, 805 |
| R20b | * |
| R38 | RES 10k, 1%, 0.25 W, 1206 |
| R16 | RES 3.3K, 0.25 W, 1%, 1206 |
| R20 | RES 5.6K, 0.25 W, 1%, 1206 |
| R27 | RES 2.0k, 1%, 1206 |
| R30 | RES 4.7K, 1%, 1206 |
| R100 | RES 15 ohm, 0.25 W, 1%, 1206 |
| R37 | RES, 10 ohm, 1206, 1%, 0.25 W |
| R17 | open |
| R28 | open |
| R26b | * |
| R20a, R4, R4b | * |

TABLE C

Components of FIG. 2

| Ref | Type/description |
|---|---|
| C19, C20 | Cap, 2.2 nF, 300 V, Y2, 7.5 mm |
| C1, C2 | open |
| C3 | Cap 220 nF, 630 Vdc/310 Vac |
| C18 | Cap 100 nF, 630 Vdc/310 Vac |
| C5 | Cap 150 nF, 630 Vdc, 5%, 10 mm |
| F1 | Fuse, 2 A, 300 V, Radial |
| L1 | 25 mH, 0.85 ohm |
| R2 | NTC, 4.7 OHM, 3.0 A, 265 V |
| V1 | Varistor, 420 V, 10 mm |
| D1a, D1b, D1c, D1d | Diode, 1 A, 1000 V, SMA |

TABLE D

Components of FIG. 5

| Ref | Type/description |
|---|---|
| C16, C24 | Cap, 100 nF, 100 V |
| C12 | Cap, 1000 uF, 50 V, 105° C., 10000 hr, 18*20 mm |
| D5 | Rectifier, ultra-fast 3 A, 200 V, DO-201A |
| R25b1 | RES 1.6 ohm, 0.5 W, 1% |
| R25b2 | RES 3.9 ohm, 0.5 W, 1% |
| R25 | RES 0.10 ohm, 1 W, 1% |
| T1 | 155 C. Ns = 25, Na = 10, Np = 96, Na2 = 10 |
| U2 | SFH615A-3091 Optocoupler DIP-4 |
| Z6 | open |
| U4 | SEA05 Current/Voltage controller, SOT23-6L |
| C25 | CAP 10 nF, 50 V, 10%, X7R, 1206 |
| C26 | CAP 220 nf, 50 V, 10%, X7R, 805 |

TABLE D-continued

Components of FIG. 5

| Ref | Type/description |
|---|---|
| C27 | CAP 10 nf, 50 V, 10%, X7R, 805 |
| C14 | open |
| D7, D8 | Diode, 0.1 A, 100 V, SOD-80 |
| R21 | RES 100 kΩ, 0.25 W, 1%, 1206 |
| R26 | RES 100 kΩ, 1%, 805 |
| R16 | RES 3.3K, 0.25 W, 1%, 1206 |
| R20 | RES 5.6K, 0.25 W, 1%, 1206 |
| R27 | RES 2.0k, 1%, 1206 |
| R30 | RES 4.7K, 1%, 1206 |
| R100 | RES 15 ohm, 0.25 W, 1%, 1206 |
| R26b | * |
| R17 | open |
| R28 | open |

TABLE E

Components of FIG. 6

| Ref | Type/description |
|---|---|
| C16 | Cap, 100 nF, 100 V |
| U2 | SFH615A-3091 Optocoupler DIP-4 |
| Z6 | open |
| U4 | SEA05 Current/Voltage controller, SOT23-6L |
| C25 | CAP 10 nF, 50 V, 10%, X7R, 1206 |
| C26 | CAP 220 nf, 50 V, 10%, X7R, 805 |
| C27 | CAP 10 nf, 50 V, 10%, X7R, 805 |
| C14 | open |
| D7, D8 | Diode, 0.1 A, 100 V, SOD-80 |
| R21 | RES 100 kΩ, 0.25 W, 1%, 1206 |
| R26 | RES 100 kΩ, 1%, 805 |
| R20b | * |
| R16 | RES 3.3K, 0.25 W, 1%, 1206 |
| R20 | RES 5.6K, 0.25 W, 1%, 1206 |
| R20a, R4, R4b | * |
| R27 | RES 2.0k, 1%, 1206 |
| R30 | RES 4.7K, 1%, 1206 |
| R100 | RES 15 ohm, 0.25 W, 1%, 1206 |
| R17 | open |
| R28 | open |

While the invention has been illustrated and described in detail in the foregoing drawings and description, the same is to be considered as illustrative and not restrictive in character, it being understood that only illustrative embodiments thereof have been shown and described and that all equivalents and all changes and modifications known in the art that come within the spirit and scope of the invention as defined herein are desired to be protected.

The invention claimed is:

1. An LED driver circuit, comprising:
a flyback converter having an input circuit and an output circuit;
a power factor correction (PFC) controller associated with the input circuit and having a control input;
a constant voltage and constant current secondary controller associated with the output circuit, and an output of the secondary controller providing a control signal to the control input of the PFC controller;
an optocoupler coupling the output of the secondary controller and the control input of the PFC controller, thereby providing isolation between the input circuit and the output circuit;
a resistive voltage divider coupled across the output of the output circuit, the midpoint node of which is coupled to a voltage control input of the secondary controller, values selected for the resistive voltage divider providing the selected maximum output voltage; and,
wherein current control and voltage control regulation of an output of the output circuit is provided by the operation of the PFC controller and the secondary controller; and
wherein the secondary controller further provides a selected maximum output voltage across an output of the output circuit in the event of open circuit across the output.

2. The LED driver circuit of claim 1, wherein the power factor correction controller uses current mode control.

3. The LED driver circuit of claim 1, wherein the input circuit further includes short protection, surge protection, and startup inrush current limiting protection.

4. An LED driver circuit, comprising:
a flyback converter having an input circuit and an output circuit;
a power factor correction (PFC) controller associated with the input circuit and having a control input;
a constant voltage and constant current secondary controller associated with the output circuit, and an output of the secondary controller providing a control signal to the control input of the PFC controller;
an optocoupler coupling the output of the secondary controller and the control input of the PFC controller, thereby providing isolation between the input circuit and the output circuit; and,
wherein current control and voltage control regulation of an output of the output circuit is provided by the operation of the PFC controller and the secondary controller; and
wherein the secondary controller further provides reduction of the output power of the output circuit in the event of an over temperature condition.

5. The LED driver circuit of claim 4, further comprising at least one positive temperature coefficient thermistor coupled between the resistive voltage divider and a ground; and wherein an increase in temperature increases the resistance and increases the voltage at the voltage divider sensed by the secondary controller, thereby commanding a reduction in the output voltage and decrease in output power.

6. The LED driver circuit of claim 5, wherein the flyback converter further includes a transformer and the at least one positive temperature coefficient thermistor is thermally coupled with the transformer.

7. The LED driver circuit of claim 5, wherein the at least one positive temperature coefficient thermistor includes at least two positive temperature coefficient thermistors coupled in parallel, thereby providing redundant over temperature protection.

8. The LED driver circuit of claim 4, wherein the power factor correction controller uses current mode control.

9. The LED driver circuit of claim 4, wherein the input circuit further includes short protection, surge protection, and startup inrush current limiting protection.

10. An LED driver circuit, comprising:
a flyback converter having an input circuit and an output circuit;
a power factor correction (PFC) controller associated with the input circuit and having a control input;
a constant voltage and constant current secondary controller associated with the output circuit, and an output of the secondary controller providing a control signal to the control input of the PFC controller;

an optocoupler coupling the output of the secondary controller and the control input of the PFC controller, thereby providing isolation between the input circuit and the output circuit; and, wherein:

current control and voltage control regulation of an output of the output circuit is provided by the operation of the PFC controller and the secondary controller; and the output circuit further comprises a voltage supply circuit providing power to the secondary controller; and the secondary controller is powered and provides output current limiting short circuit protection before and during startup of the input portion of the driver circuit.

11. The LED driver circuit of claim 10, further comprising a negative temperature coefficient thermistor coupled in series with an output of the output circuit, the thermistor providing added resistance to limit current output in the event of a short across the output of the output circuit.

12. The LED driver circuit of claim 10, wherein the power factor correction controller uses current mode control.

13. The LED driver circuit of claim 10, wherein the input circuit further includes short protection, surge protection, and startup inrush current limiting protection.

* * * * *